United States Patent [19]

Degura

[11] Patent Number: 5,684,614
[45] Date of Patent: Nov. 4, 1997

[54] OPTICAL SPACE COMMUNICATION APPARATUS

[75] Inventor: Yasusaburo Degura, Urawa, Japan

[73] Assignee: Canon Kabushiki Kaisha, Tokyo, Japan

[21] Appl. No.: 591,722

[22] Filed: Jan. 25, 1996

[30] Foreign Application Priority Data

Jan. 26, 1995 [JP] Japan .................................. 7-028922

[51] Int. Cl.$^6$ ...................................................... H04B 10/00
[52] U.S. Cl. ............................................ 359/172; 359/159
[58] Field of Search ............................... 359/172, 159, 359/152, 154, 153, 169, 170, 191

[56] References Cited

U.S. PATENT DOCUMENTS

| 3,566,128 | 2/1971 | Arnuad | 359/191 |
| 4,867,560 | 9/1989 | Kunitsugu | 359/172 |
| 5,065,455 | 11/1991 | Ito et al. | 359/172 |
| 5,142,400 | 8/1992 | Solinsky | 359/172 |
| 5,329,395 | 7/1994 | Endo et al. | 359/159 |
| 5,448,391 | 9/1995 | Iriyama et al. | 359/172 |
| 5,594,580 | 1/1997 | Sakanaka et al. | 359/172 |

FOREIGN PATENT DOCUMENTS

| 0560315 | 9/1993 | European Pat. Off. |
| 0653852 | 5/1995 | European Pat. Off. |
| 2236477 | 9/1990 | Japan. |
| 6152516 | 5/1994 | Japan. |

*Primary Examiner*—Wellington Chin
*Assistant Examiner*—Rafael Bacares
*Attorney, Agent, or Firm*—Fitzpatrick, Cella, Harper & Scinto

[57] ABSTRACT

An optical space communication apparatus for communicating by propagating a light signal in free space, including a multiplexer for multiplexing a first pilot signal with a transmission signal, a first converter for converting a first electric signal from the multiplexer into a first light signal, a transmitting optical system for transmitting the first light signal to a party apparatus, a receiving optical system for receiving a second light signal including a second pilot signal, having been transmitted from the party apparatus, a second converter for converting the second light signal into a second electric signal, a first band-pass filter having a pass region including a frequency of the second pilot signal, a first detector for detecting the second electric signal having passed through the first band-pass filter, a second band-pass filter having a pass region not including the frequency of the second pilot signal, a second detector for detecting the second electric signal having passed through the second band-pass filter, an adjuster controlled by a controller, for adjusting an angle of the receiving optical system, and a frequency variable device for making variable a cut-off frequency of a servo system loop filter for the controller, based on signals from the first and second detectors.

10 Claims, 4 Drawing Sheets

OPTICAL SPACE COMMUNICATION APPARATUS

BACKGROUND OF THE INVENTION

1. Field of the Invention

The present invention relates to an optical space communication apparatus provided with a function to correct an angle of transmitting light or receiving light, which performs two-way information transmission by propagating a light signal in a beam shape in a free space.

2. Related Background Art

In conventional optical space communication apparatus, a transmission-side device transmits a signal in which a pilot signal is superimposed on a main signal (transmission signal), and a reception-side device detects the pilot signal to extract information about an angle deviation between the optical axis of a receiving optical system and the receiving light, thereby adjusting the angle upon start of transmission or correcting the angle during transmission. A generally employed method for detecting the angular deviation is one arranged in such a manner that a receiving light spot focused by the receiving optical system is guided onto a photodetector and the photodetector detects a position of the spot. The pilot signal is a signal having a frequency band different from and narrower than that of the main signal. An example of the pilot signal is a sinusoidal signal.

The photosensor employed is a PSD (Position Sensitive Detector) or a CCD (Charge Coupled Device), which demonstrates weakness with respect to the response speed when the frequency of the pilot signal is high. A method for overcoming it employs an array of plural photodiodes with fast response speed and detects differences of outputs from the photodiodes. For example, as shown in FIG. 1, photodetectors $1a$ to $1d$ with same characteristics are located in the four quadrants, respectively, and light intensities thereof are obtained through load impedances $2a$ to $2d$ and low limiting circuits $3a$ to $3d$, finally obtaining a position of the receiving light spot from sums and differences of these outputs.

The reason why the pilot signal is used is that high-sensitive reception is possible because of its narrower band than that of the main signal and that the control function can be maintained even if the main signal becomes weak or even if there is no input of the main signal. Further, influence of background light can be decreased when the angular deviation is detected with the pilot signal having a certain high frequency component, different from low frequency components such as dc light.

If rain, fog, or the like decreases the light intensity on a transmission path, the detection level of the pilot signal will be lowered in the above system, which will degrade S/N ratios, being signal-to-noise ratios, and which will thus greatly affect accuracy of angular deviation information. Therefore, the system of the above type includes the low limiting circuits $3a$ to $3d$ in order to avoid degradation of the accuracy of angular deviation information.

The background light is all light other than the light transmitted from the transmission-side device, in the light entering the reception-side device. For example, the background light includes the sun light, lights of buildings, etc. However, shot noise increases in the photodiodes used as photodetectors when the background light greatly increases, for example when the direct rays of the sun are incident on the photodiodes. In that case, the shot noise is detected as multiplexed with the pilot signal. This causes a problem of erroneous angle correction when only the shot noise due to the background light exceeds the low limiting value in spite of absence of incidence of the pilot light.

SUMMARY OF THE INVENTION

An object of the present invention is to provide an optical space communication apparatus which can correct the angle of transmitting light or receiving light without any practical trouble even with an extreme increase of the background light, solving the above problem.

In order to achieve the above object, the present invention provides an optical space communication apparatus for performing communication by propagating a light signal in a free space, comprising:

multiplexing means for multiplexing a first pilot signal with a transmission signal;

first converting means for converting a first electric signal from the multiplexing means into a first light signal;

a transmitting optical system for transmitting the first light signal to a party apparatus;

a receiving optical system for receiving a second light signal including a second pilot signal, having been transmitted from the party apparatus;

second converting means for converting said second light signal into a second electric signal;

a first band-pass filter having a pass region comprising a frequency of the second pilot signal;

first detecting means for detecting the second electric signal having passed through the first band-pass filter;

a second band-pass filter having a pass region not including the frequency of the second pilot signal;

second detecting means for detecting the second electric signal having passed through the second band-pass filter;

adjusting means for adjusting an angle of the receiving optical system;

control means for controlling the adjusting means; and frequency variable means for making variable a cut-off frequency of a servo system loop filter for the control means, based on signals from the first detecting means and the second detecting means.

In order to achieve the above object, the present invention further provides an optical space communication apparatus, which is provided with a function to adjust an angle of a receiving optical system so as to keep the optical axis of the transmission optical system aligned with the optical axis of the receiving optical system and which performs two-way information transmission with light signals between apparatus opposed to each other at a predetermined distance, the optical space communication apparatus comprising generating means for generating a first pilot signal in a sinusoidal form, multiplexing means for multiplexing the first pilot signal with a transmission signal, electro-optical converting means for converting a first electric signal from the multiplexing means into a first light signal, a transmitting optical system having beam size variable means for making the beam size variable on the reception side (on the party side) of the first light signal, a receiving optical system for receiving a second light signal comprising a second pilot signal, having been transmitted from the party apparatus opposed in order to detect an angular deviation of the receiving optical system, a plurality of segmental opto-electrical conversion elements each for receiving the second light signal and converting the second light signal into a second electric signal, detecting means for splitting each of the signals converted into by the plurality of segmental opto-electrical conversion elements into two signals, letting the signals pass through band-pass filters having a pass region comprising a frequency of the second pilot signal of the party apparatus and band-pass filters having a pass region not including the frequency of the second pilot signal, and thereafter detecting the signals, and frequency variable means for making variable a cut-off frequency of a servo system loop filter for correction of the angle of the receiving optical system, based on the signals thus detected.

The optical space communication apparatus having the above configuration is arranged to multiplex the pilot signal with the main signal being the transmission signal, to convert the first electric signal thus made into the first light signal, and to transmit the light signal as adjusting the beam size to a predetermined size on the reception side. The second light signal comprising the pilot signal from the party apparatus is received by the plurality of segmental opto-electrical conversion elements to be converted into second electric signals, these electric signals are split each into two signals, the signals are let to pass the band-pass filters having the pass region comprising the frequency of the pilot signal of the party apparatus and the band-pass filters having the pass region not including the frequency of the pilot signal of the party apparatus, and the detection means detects the respective signals. Angle correction of the transmitting optical system is effected by changing the cut-off frequency of the servo system loop filter, based on these detection signals, and then two-way information transmission is performed between the transmission apparatus opposed to each other as being apart at a predetermined distance.

DESCRIPTION OF THE PREFERRED EMBODIMENT

The optical space communication apparatus of the present invention will be explained in detail by reference to the embodiment depicted in FIG. 2 to FIG. 5.

Figure 1:
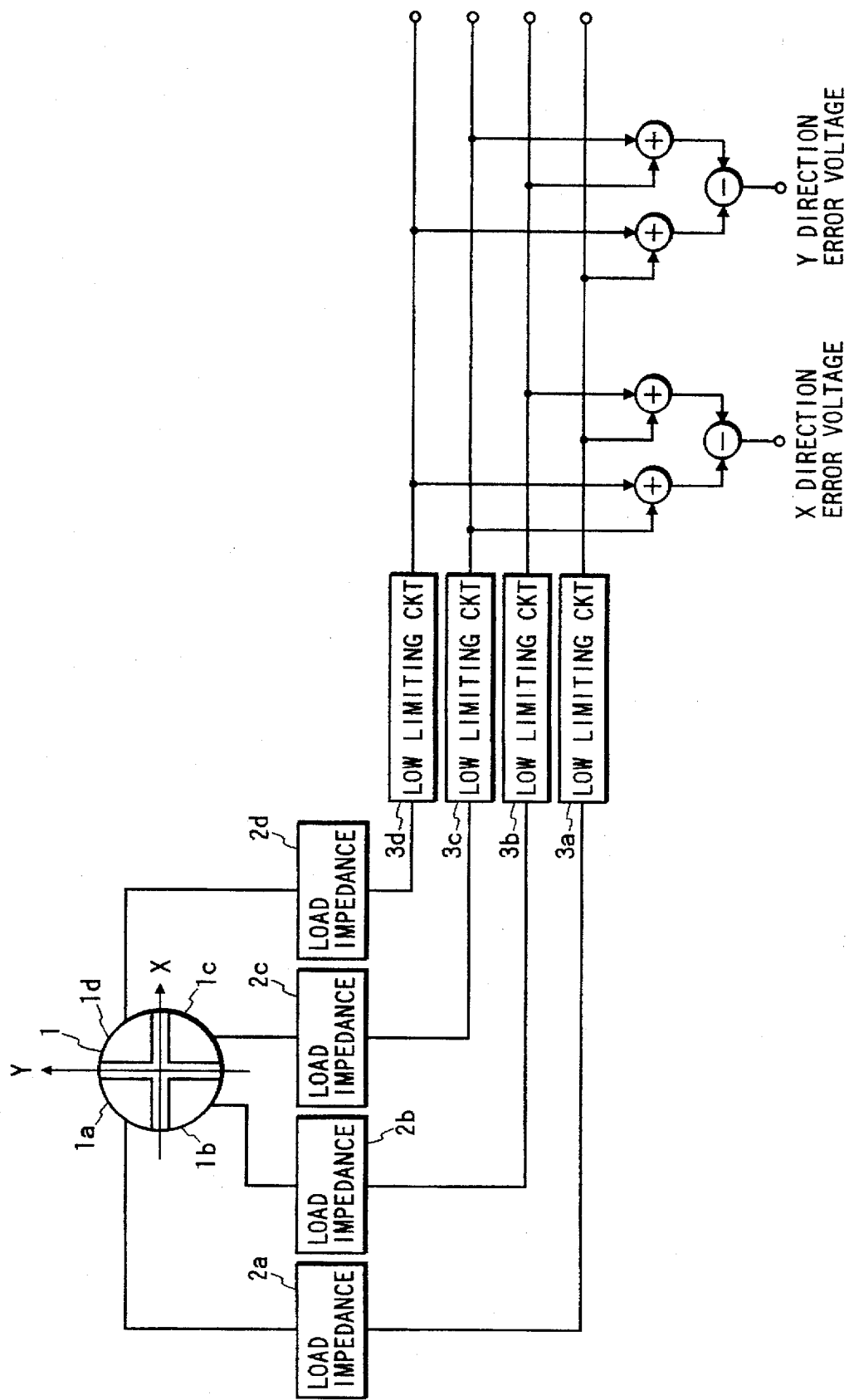
FIG. 1 is a structural drawing to show an angular deviation detecting part in the conventional example.
Figure 2:
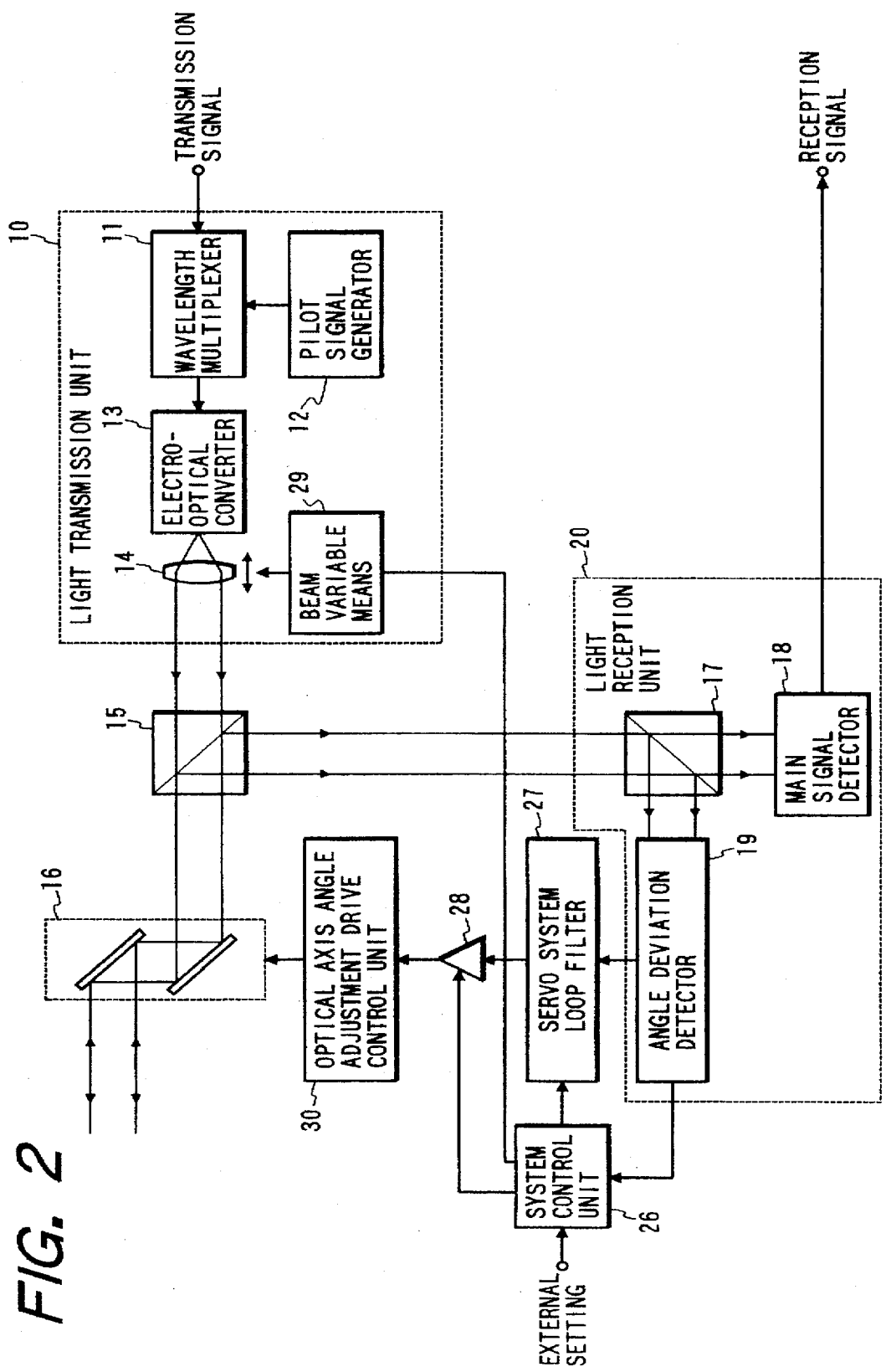
FIG. 2 is a structural drawing to show the optical space communication apparatus of the present invention.

FIG. 2 is a structural drawing to show the two-way optical space communication apparatus, in which in a light transmission unit 10 an output of a generator 12 for generating the sinusoidal pilot signal as described previously is connected to a wavelength multiplexer 11 for receiving a transmission signal and an output (first electric signal) of the multiplexer 11 is connected to an electro-optical converter 13. There are a lens system 14, a polarizing beam splitter 15, and an optical-axis angle adjustment drive mechanism 16 arranged on the optical path ahead of the electro-optical converter 13.

A beam splitter 17 is located on the optical path in the direction of reflection of the polarizing beam splitter 15. A main signal detector 18 for detecting the main signal and outputting a reception signal is placed in the direction of transmission of the beam splitter 17, and an angle deviation detector 19 is placed in the direction of reflection of the beam splitter 17, thereby composing a light reception unit 20.

Figure 3:
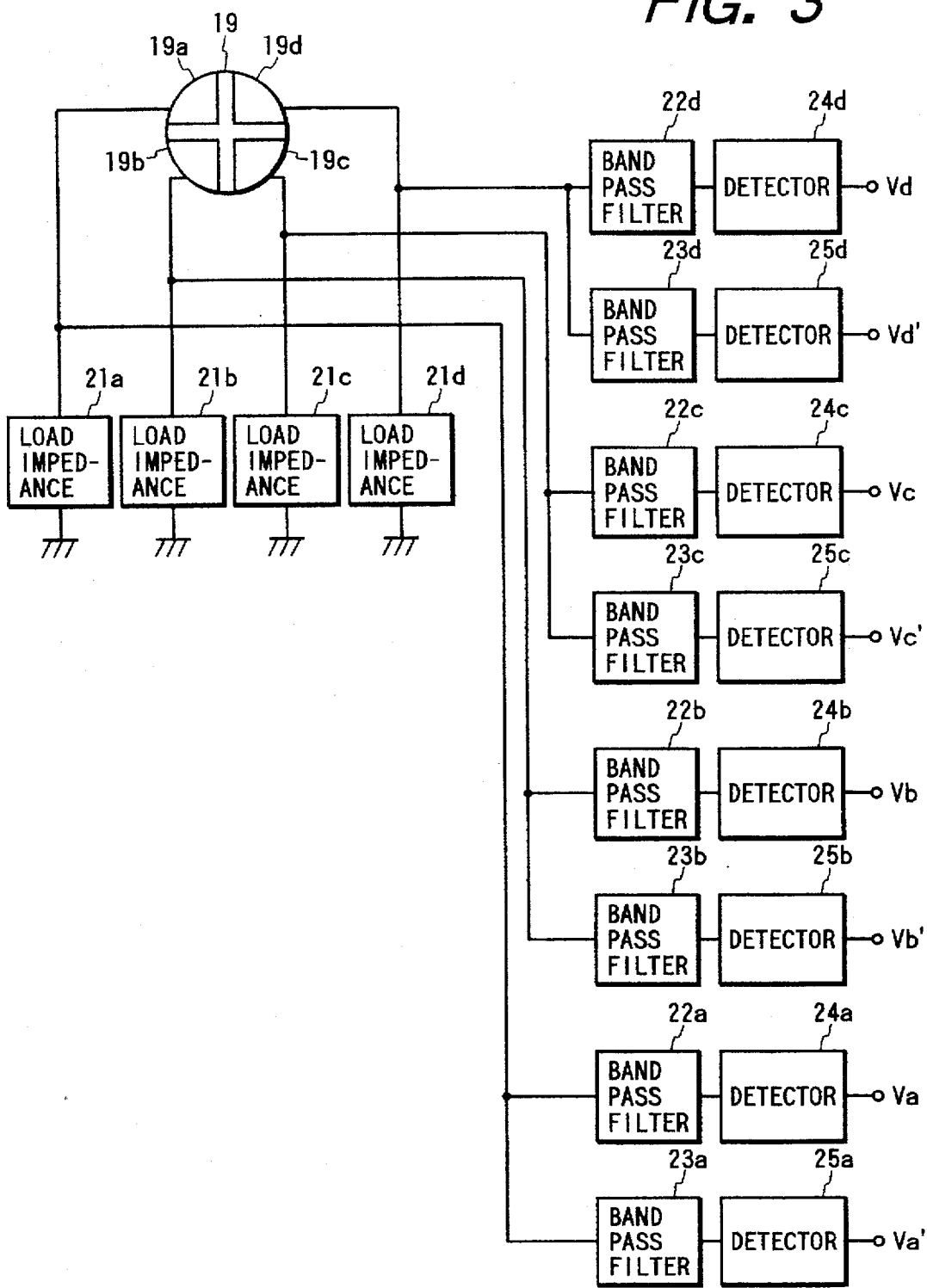
FIG. 3 is a structural drawing to show the angular deviation detecting part of FIG. 2.

The angular deviation detector 19 is divided into four photodetection elements 19a to 19d, as shown in FIG. 3, and electric signals from the respective elements are supplied to the load impedances 21a to 21d. Further, each of these electric signals is split into two, which are supplied through band-pass filter 22a to 22d and band-pass filter 23a to 23d to corresponding detectors 24a to 24d and 25a to 25d. An output of the angle deviation detector 19 is connected to a system control unit 26 having an external condition setting device and to a servo system loop filter 27, and an output of the system control unit 26 is connected to the servo system loop filter 27, to an amplifier 28, and to a beam size variable means 29 for driving the lens system 14. Further, an output of the amplifier 28 is connected through an optical-axis angle adjustment drive control unit 30 to the optical-axis angle adjustment drive mechanism 16. Further, an output of the servo system loop filter 27 is connected to the amplifier 28.

The main signal, being the transmission signal, is multiplexed in the multiplexer 11 with the first pilot signal from the pilot signal generator 12, the thus multiplexed signal is converted into a first light signal (first light beam) in the electro-optical converter 13, the beam size variable means 29 for changing the beam size of the transmission beam moves the lens system 14 along the optical axis to control the beam size so that a predetermined beam size may be achieved at a position where a party apparatus is located, and the light signal is transmitted through the polarizing beam splitter 15 and optical-axis angle adjustment drive mechanism 16.

On the other hand, a second light signal (second light beam) sent from the party apparatus and including a second pilot signal is guided through the optical-axis angle adjustment drive mechanism 16 and polarizing beam splitter 15 to the light reception unit 20, where it is split by the beam splitter 17 into two beams traveling toward the main signal detector 18 and toward the angle deviation detector 19. The main signal detector 18 receives the main signal to output the reception signal, while the angle deviation detector 19 receives the second pilot signal sent from the party apparatus by each of the four segmental detection elements 19a to 19d, which generate electric currents corresponding to light intensities of received light. These current signals are converted into voltage signals (second electric signals) in the load impedances 21a to 21d. Each of these voltage signals is split into two signals, the bands of which are limited by the band-pass filter 22a to 22d and band-pass filter 23a to 23d. After that, the voltage signals are detected by the associated detectors 24a to 24d and 25a to 25d to become detection signals Va to Vd and Va' to Vd' corresponding to respective receiving-light levels.

Figure 4:
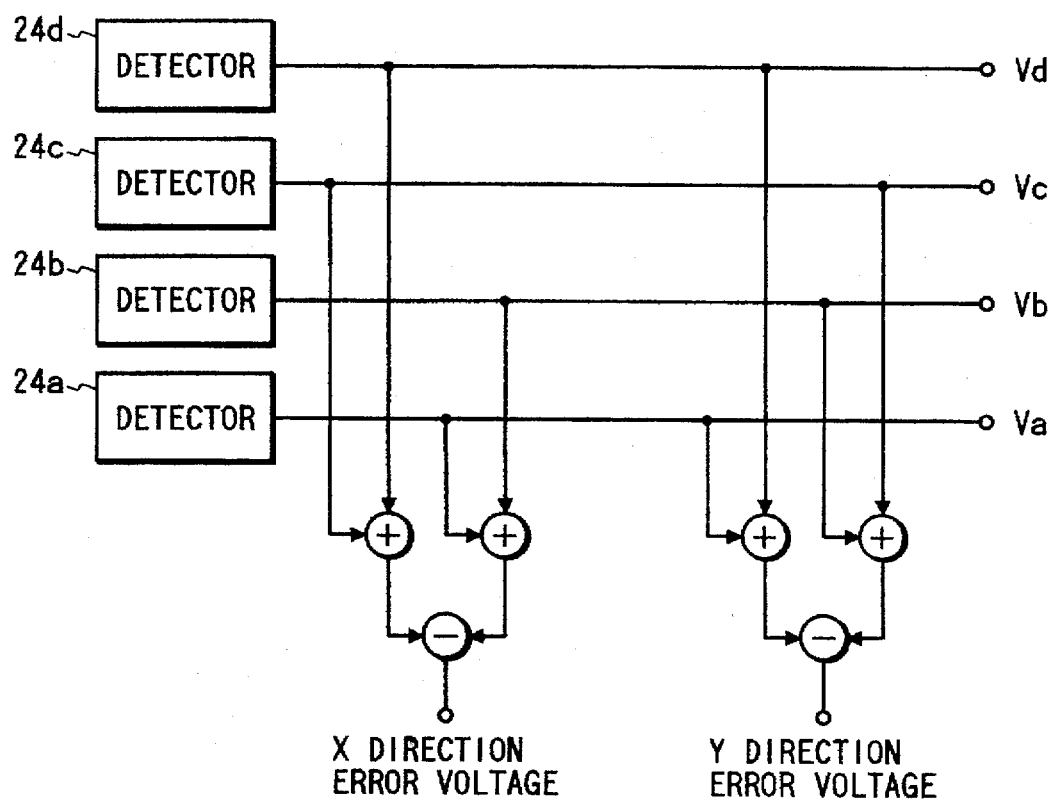
FIG. 4 is a structural drawing to show the angular deviation detecting part of FIG. 2.

As shown in FIG. 4, the detection signals Va to Vd are used to detect the angular deviation between the receiving light and the optical axis of the light reception unit 20. Further, the system control unit 26 controls the servo system loop filter 27, amplifier 28, and beam variable means 29 to send a signal to the optical-axis angle adjustment drive control unit 30, whereby the optical-axis angle adjustment drive control unit 30 controls the optical-axis angle adjustment drive mechanism 16 to correct the angular deviation. In the apparatus the optical axis of the light transmission unit 10 is preliminarily aligned with the optical axis of the light reception unit 20. Thus, once the angular deviation is corrected between the receiving light from the party apparatus and the light reception unit 20, the transmission light can be sent on the same optical axis as the receiving light is transmitted from the party apparatus. Two-way optical space communication as being always stable becomes possible by the above operation between the apparatus opposed to each other.

Figure 5:
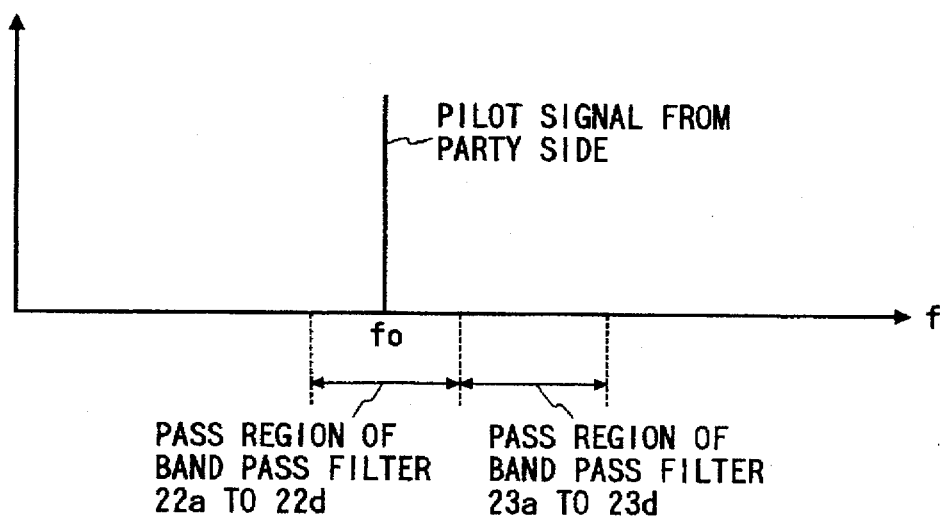
FIG. 5 is an explanatory drawing to illustrate band-pass filters shown in FIG. 2.

FIG. 5 shows the band-pass filters 22a to 22d, 23a to 23d, in which, letting f0 be the frequency of the second pilot signal transmitted from the party apparatus, the band-pass filters 22a to 22d include the frequency f0 in the pass region and the band-pass filters 23a to 23d do not include the frequency f0 in the pass region. It is noted here that the pass regions of the band-pass filters 22a to 22d and band-pass filters 23a to 23d do not have to be continuously arranged. They may be set apart from each other or may overlap with each other. Further, one pass region may be included completely in the other. The point is whether the pass region includes the frequency f0 or not.

The shot noise due to the background light can be considered to have almost uniform noise power per unit frequency within a certain frequency range. For example, if the band widths of the band-pass filters 22a, 23a are known, the S/N ratio of the detection signal Va including the frequency f0 can be calculated based on the detection signals Va and Va'. This is because the detection signal Va is a signal in which the shot noise is multiplexed with the second pilot signal and the detection signal Va' is a signal which represents only the shot noise. The same means can also be used to recognize the noise light when only the noise light is incident without incidence of the second pilot signal. When absence of incidence of the second pilot signal is recognized from the detection signals Va to Vd and Va' to Vd' and even if the values of the detection signals Va to Vd are not less than the low limiting value set, the all values are set to the lower limiting value.

If in spite of reception of the second pilot signal the system control unit 26 determines from the detection signals Va to Vd and Va' to Vd' that the level of the background light is too high to accurately perform the angle correction of the receiving light because the strong background light could degrade the S/N ratio of the second pilot signal used in detecting the angular deviation, the system control unit 26 lowers the cut-off frequency of the servo system loop filter 27 for angle correction, thereby performing the angle correction of the receiving light without practical trouble by controlling the optical-axis angle adjustment drive mechanism 16. Namely, when it is considered that there is no extremely quick vibration because of good installation conditions of apparatus, the S/N ratio of the second pilot signal used in detecting the angular deviation can be improved by lowering the frequency characteristics of the servo system loop filter 27.

If the system control unit 26 determines from the detection signals Va to Vd and Va' to Vd' that accurate angle correction of the receiving light cannot be done and if the installation conditions do not allow the frequency characteristics of the servo system loop filter 27 to be lowered, the system control unit 26 decreases the servo system loop gain as victimizing the accuracy of angle correction and further controls the beam variable means 29 to enlarge the size of the transmission beam to the party apparatus opposed in order to compensate for the decrease of the loop gain. This results in decreasing a margin for attenuation of light signal on the transmission path. However, an increase of the level of incidence of the background light due to the direct rays of the sun implies low attenuation of light on the transmission path, and the same can be applied to the light signal on the transmission path, thus causing no practical trouble. If the background light decreases below the permissible level thereof in a normal system condition, the control unit 26 returns the system to the normal condition.

The cut-off frequency and the loop pain of the servo system loop filter 27 for controlling the angle of the receiving optical system can be arranged as to be variable in such a manner that the detection signals Va to Vd are subjected to analog-digital conversion, the digital signals are taken into a CPU in the control unit 26, and they are made variable on software or by using an analog circuit. Further, the size of the transmission beam to the party apparatus opposed can be made variable by horizontally moving the lens system 14 disposed between the electro-optical converter 13 and the polarizing beam splitter 15 along the optical axis, and the control of movement of the lens system is executed by the CPU in the control unit 26.

As detailed above, the optical space communication apparatus according to the present invention is arranged in such a manner that the angular deviation detecting unit of receiving light can independently detect the receiving level of the pilot signal and the receiving level of shot noise due to the background light, whereby the apparatus can perform the angle correction of receiving light without practical trouble even with an extreme increase of the shot noise due to the background light.

What is claimed is:

1. An optical space communication apparatus for performing communication by propagating a light signal in a free space, comprising:

multiplexing means for multiplexing a first pilot signal with a transmission signal;

first converting means for converting a first electric signal from said multiplexing means into a first light signal;

a transmitting optical system for transmitting said first light signal to a party apparatus;

a receiving optical system for receiving a second light signal including a second pilot signal, having been transmitted from said party apparatus;

second converting means for converting said second light signal into a second electric signal;

a first band-pass filter having a pass region comprising a frequency of said second pilot signal;

first detecting means for detecting said second electric signal having passed through said first band-pass filter;

a second band-pass filter having a pass region not including the frequency of said second pilot signal;

second detecting means for detecting said second electric signal having passed through said second band-pass filter;

adjusting means for adjusting an angle of said receiving optical system;

control means for controlling said adjusting means; and frequency variable means for making variable a cut-off frequency of a servo system loop filter for said control means, based on signals from said first detecting means and said second detecting means.

2. The apparatus according to claim 1, further comprising:

gain variable means for making a servo system loop gain for said control means variable, based on the signals from said first detecting means and said second detecting means; and beam size variable means for making a transmission beam size of said first light signal variable, based on the signals from said first detecting means and said second detecting means.

3. The apparatus according to claim 1, wherein if control of adjustment of the angle by said control means cannot be done accurately, said frequency variable means lowers the cut-off frequency of the servo system loop filter for said control means.

4. The apparatus according to claim 2, wherein if variable operation of the frequency by said frequency variable means cannot be done, said gain variable means decreases the servo system loop gain for said control means and said beam size variable means enlarges the transmission beam size of said first light signal.

5. An optical space communication apparatus for performing communication by propagating a light signal in a free space, comprising:

multiplexing means for multiplexing a first pilot signal with a transmission signal;

first converting means for converting a first electric signal from said multiplexing means into a first light signal;

a transmitting optical system for transmitting said first light signal to a party apparatus;

a receiving optical system for splitting a light signal having been transmitted from said party apparatus into a predetermined light signal and a second light signal comprising a second pilot signal;

detection means for detecting a main signal from said predetermined light signal;

second converting means for converting said second light signal into a second electric signal;

a first band-pass filter having a pass region comprising a frequency of said second pilot signal;

first detecting means for detecting said second electric signal having passed through said first band-pass filter;

a second band-pass filter having a pass region not including the frequency of said second pilot signal;

second detecting means for detecting said second electric signal having passed through said second band-pass filter;

adjusting means for adjusting an angle of said receiving optical system;

control means for controlling said adjusting means; and frequency variable means for making variable a cut-off frequency of a servo system loop filter for said control means, based on signals from said first detecting means and said second detecting means.

6. The apparatus according to claim 5, further comprising:

gain variable means for making a servo system loop gain for said control means variable, based on the signals from said first detecting means and said second detecting means; and beam size variable means for making a transmission beam size of said first light signal variable, based on the signals from said first detecting means and said second detecting means.

7. The apparatus according to claim 5, wherein if control of adjustment of the angle by said control means cannot be done accurately, said frequency variable means lowers the cut-off frequency of the servo system loop filter for said control means.

8. The apparatus according to claim 6, wherein if variable operation of the frequency by said frequency variable means cannot be done, said gain variable means decreases the servo system loop gain for said control means and said beam size variable means enlarges the transmission beam size of said first light signal.

9. An angle adjusting method of a receiving optical system in an optical space communication system for performing communication by propagating a light signal in a free space, comprising:

a step of multiplexing a first pilot signal with a transmission signal by multiplexing means;

a step of converting a first electric signal from said multiplexing means into a first light signal;

a step of transmitting said first light signal to a party apparatus through a transmitting optical system;

a step of receiving through a receiving optical system a second light signal comprising a second pilot signal, having been transmitted from said party apparatus;

a step of converting said second light signal into a second electric signal;

a step of detecting by first detecting means said second electric signal having passed through a first band-pass filter having a pass region comprising a frequency of said second pilot signal;

a step of detecting by second detecting means said second electric signal having passed through a second band-pass filter having a pass region not including the frequency of said second pilot signal; and a step of making variable a cut-off frequency of a servo system loop filter for adjustment of an angle of said receiving optical system, based on signals from said first detecting means and said second detecting means.

10. An angle adjusting method of a receiving optical system in an optical space communication system for performing communication by propagating a light signal in a free space, comprising:

a step of multiplexing a first pilot signal with a transmission signal;

a step of converting a first electric signal from said multiplexing means into a first light signal;

a step of transmitting said first light signal to a party apparatus through a transmitting optical system;

a step of receiving through a receiving optical system a second light signal comprising a second pilot signal, having been transmitted from said party apparatus;

a step of converting said second light signal into a second electric signal;

a step of detecting by first detecting means said second electric signal having passed through a first band-pass filter having a pass region comprising a frequency of said second pilot signal;

a step of detecting by second detecting means said second electric signal having passed through a second band-pass filter having a pass region not including the frequency of said second pilot signal;

a step of making variable a servo system loop gain for adjustment of an angle of said receiving optical system, based on signals from said first detecting means and said second detecting means; and a step of making a transmission beam size of said first light signal variable, based on the signals from said first detecting means and said second detecting means.

* * * * *

UNITED STATES PATENT AND TRADEMARK OFFICE
CERTIFICATE OF CORRECTION

PATENT NO. : 5,684,614
DATED : November 4, 1997
INVENTOR(S) : Degura

It is certified that error appears in the above-identified patent and that said Letters Patent is hereby corrected as shown below:

FOREIGN PATENT DOCUMENTS

"2236477" should read --2-236477--, and
"6152516" should read --6-152516--.

COLUMN 1:

Line 35, after "with" insert --the--.

COLUMN 3:

Line 1, into" should be deleted.

COLUMN 5:

Line 3, "Two-way" should read --Stable two-way--;
   Line 4, delete "as being always stable";
   Line 34, "the all" should read --all of the--; and
   Line 36, after "If" insert --,-- (a comma), and
      after "signal" insert --,-- (a comma).

UNITED STATES PATENT AND TRADEMARK OFFICE
CERTIFICATE OF CORRECTION

PATENT NO. : 5,684,614
DATED : November 4, 1997
INVENTOR(S) : Degura

It is certified that error appears in the above-identified patent and that said Letters Patent is hereby corrected as shown below:

COLUMN 6:

Line 5, "pain" should read --qain--.

Signed and Sealed this

Thirtieth Day of June, 1998

Attest:

BRUCE LEHMAN

Attesting Officer

Commissioner of Patents and Trademarks